United States Patent
Fukui et al.

(10) Patent No.: US 12,384,360 B2
(45) Date of Patent: Aug. 12, 2025

(54) VEHICLE DRIVING ASSISTANCE APPARATUS

(71) Applicant: TOYOTA JIDOSHA KABUSHIKI KAISHA, Toyota (JP)

(72) Inventors: Yusuke Fukui, Toyota (JP); Yuhei Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/986,176

(22) Filed: Nov. 14, 2022

(65) Prior Publication Data

US 2023/0166727 A1 Jun. 1, 2023

(30) Foreign Application Priority Data

Nov. 26, 2021 (JP) .................................. 2021-191918

(51) Int. Cl.
  *B60W 30/09* (2012.01)
  *B60W 30/095* (2012.01)
  *B60W 50/08* (2020.01)
  *B60W 50/14* (2020.01)

(52) U.S. Cl.
  CPC ........ *B60W 30/09* (2013.01); *B60W 30/0956* (2013.01); *B60W 50/08* (2013.01); *B60W 50/14* (2013.01); *B60W 2050/146* (2013.01); *B60W 2540/215* (2020.02)

(58) Field of Classification Search
  CPC .. B60W 30/09; B60W 30/0956; B60W 50/14; B60W 2050/146; B60W 2540/215; B60W 50/80
  See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,701,307 B1* | 7/2017 | Newman | B60W 30/095 |

(Continued)

FOREIGN PATENT DOCUMENTS

| | | |
|---|---|---|
| JP | 2002-019490 A | 1/2002 |
| JP | 2019-023079 A | 2/2019 |

(Continued)

*Primary Examiner* — Kito R Robinson
*Assistant Examiner* — Alexander V Gentile
(74) *Attorney, Agent, or Firm* — Dinsmore & Shohl LLP

(57) ABSTRACT

A vehicle driving assistance apparatus executes a driving assistance control which provides a driver of an own vehicle with a driving assistance when a predetermined execution condition becomes satisfied. The apparatus performs an assistance delay function and a positive assistance function. The assistance delay function is a function to change the predetermined execution condition such that a timing of starting to execute the driving assistance control is later than a base timing. The positive assistance function is a function to change the predetermined execution condition such that the timing of starting to execute the driving assistance control is earlier than the base timing. The apparatus does not perform the assistance delay function even when the assistance delay function is requested to be performed while the positive assistance function is requested to be performed.

4 Claims, 7 Drawing Sheets

(56) References Cited

U.S. PATENT DOCUMENTS

| | | |
|---|---|---|
| 9,873,412 B2 | 1/2018 | Moriizumi |
| 10,793,147 B2 | 10/2020 | Kaminade et al. |
| 2013/0226408 A1 | 8/2013 | Fung et al. |
| 2021/0061309 A1 | 3/2021 | Kawanai |
| 2021/0070287 A1 | 3/2021 | Takahashi et al. |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |

FOREIGN PATENT DOCUMENTS

| | | | | |
|---|---|---|---|---|
| JP | 2019-114087 A | | 7/2019 | |
| JP | 2019202586 A | * | 11/2019 | ........ B60W 30/0956 |
| WO | WO-2019146261 A1 | * | 8/2019 | ............. B60R 25/24 |
| WO | WO-2020129731 A1 | * | 6/2020 | |

* cited by examiner

VEHICLE DRIVING ASSISTANCE APPARATUS

CROSS-REFERENCE TO RELATED APPLICATIONS

This application claims priority to Japanese patent application No. JP 2021-191918 filed on Nov. 26, 2021, the content of which is hereby incorporated by reference in its entirety.

BACKGROUND

Field

The present disclosure relates to a vehicle driving assistance apparatus.

Description of the Related Art

There is known a vehicle driving assistance apparatus as an autonomous driving apparatus or an automatic driving apparatus which executes a collision avoidance control as a driving assistance control. The collision avoidance control is a control to perform (i) an alert to a driver to avoid a collision of an own vehicle with an object ahead thereof and/or (ii) a deceleration-to-stop to autonomously decelerate the own vehicle to stop.

Further, there is known a vehicle driving assistance apparatus which has an assistance delay function of rendering a timing of starting to perform the alert to the driver later than an ordinary timing when an operation to a steering wheel carried out by the driver to avoid the collision of the own vehicle with the object, is detected (for example, see JP 2019-202586 A). The ordinary timing is a timing of starting to perform the alert when the operation to a steering wheel carried out by the driver to avoid the collision of the own vehicle with the object, is not detected.

For example, when the driver is an aged person, the driver may desire to start to perform the alert to the driver at a timing earlier than the ordinary timing. Accordingly, there is known the vehicle driving assistance apparatus which has a positive assistance function to render the timing of starting to perform the alert to the driver earlier than the ordinary timing when the driver desires the timing of starting to perform the alert earlier than the ordinary timing. In this regard, if the positive assistance function is not performed but the assistance delay function is performed when a probability of the collision of the own vehicle with the object is increasing, the alert inconveniently starts to be performed at a timing later than the ordinary timing although the driver desires that the alert starts to be performed at a timing earlier than the ordinary timing. This is not preferred.

SUMMARY

An object of the present disclosure is to provide a vehicle driving assistance apparatus which provides the driver with a driving assistance as the driver desires.

According to the present disclosure, a vehicle driving assistance apparatus comprises an electronic control unit configured to execute a driving assistance control which provides a driver of an own vehicle with a driving assistance when a predetermined execution condition becomes satisfied. The electronic control unit is configured to perform an assistance delay function and a positive assistance function. The assistance delay function is a function to change the predetermined execution condition such that a timing of starting to execute the driving assistance control is later than a base timing. The positive assistance function is a function to change the predetermined execution condition such that the timing of starting to execute the driving assistance control is earlier than the base timing.

The electronic control unit is configured not to perform the assistance delay function even when the assistance delay function is requested to be performed while the positive assistance function is requested to be performed.

If the assistance delay function is performed when the driver requests to perform the positive assistance function, the timing of starting to execute the driving assistance control is rendered earlier than the base timing. Thereby, the driving assistance desired by the driver is not provided. With the present disclosure, when the positive assistance function and the assistance delay function are both requested to be performed, the assistance delay function is not performed. As a result, the positive assistance function is performed. Thus, the driving assistance desired by the driver is provided.

According to a teaching of the present disclosure, the assistance delay function may be a function to change the predetermined execution condition such that the timing of starting to execute the driving assistance control is later than the base timing when a predetermined driving operation is detected. In this teaching, the predetermined driving operation may be a driving operation to the own vehicle which is carried out by the driver and leads to a probability of rendering the driving assistance by the driving assistance control unnecessary.

If the driving assistance control starts to be executed when the driver carries out the driving operation to the own vehicle which renders the driving assistance by the driving assistance control unnecessary, the driver may feel inconvenience. With this teaching of the present disclosure, when the predetermined driving operation carried out by the driver which renders the driving assistance by the driving assistance control unnecessary, is detected, the timing of starting to execute the driving assistance control is rendered later than the base timing. Thus, the driver does not feel inconvenience.

According to another teaching of the present disclosure, the driving assistance control may be a deceleration-to-stop control which autonomously decelerates the own vehicle to stop to avoid a collision of the own vehicle with an object ahead of the own vehicle. In this teaching, the predetermined driving operation may be a driving operation to the own vehicle carried out by the driver to avoid the collision of the own vehicle with the object.

When the driving assistance control is the deceleration-to-stop control to autonomously decelerate the own vehicle to stop to avoid the collision of the own vehicle with the object ahead thereof, and the driver requests to perform the positive assistance function, if the assistance delay function is performed, the timing of starting to execute the deceleration-to-stop control is rendered earlier than the base timing. Thus, the driving assistance desired by the driver is not provided. With this teaching of the present disclosure, when the positive assistance function and the assistance delay function are requested to be performed, the assistance delay function is not performed. As a result, the positive assistance function is performed. Thus, the driving assistance desired by the driver is provided.

According to another teaching of the present disclosure, the electronic control unit may be configured to determine that the positive assistance function is requested to be performed when the electronic control unit receives a predetermined signal from the driver. In this teaching, the predetermined signal may be a signal which represents that the driver needs performing the positive assistance function.

With this teaching of the present disclosure, the driver can request to perform the positive assistance function by transmitting the signal which represents that the positive assistance function needs to be performed.

Elements of the present disclosure are not limited to elements of embodiments and modified examples of the present disclosure described with reference to the drawings. The other objects, features and accompanied advantages of the present disclosure can be easily understood from the embodiments and the modified examples of the present disclosure.

DESCRIPTION OF THE EMBODIMENTS

Figure 1:
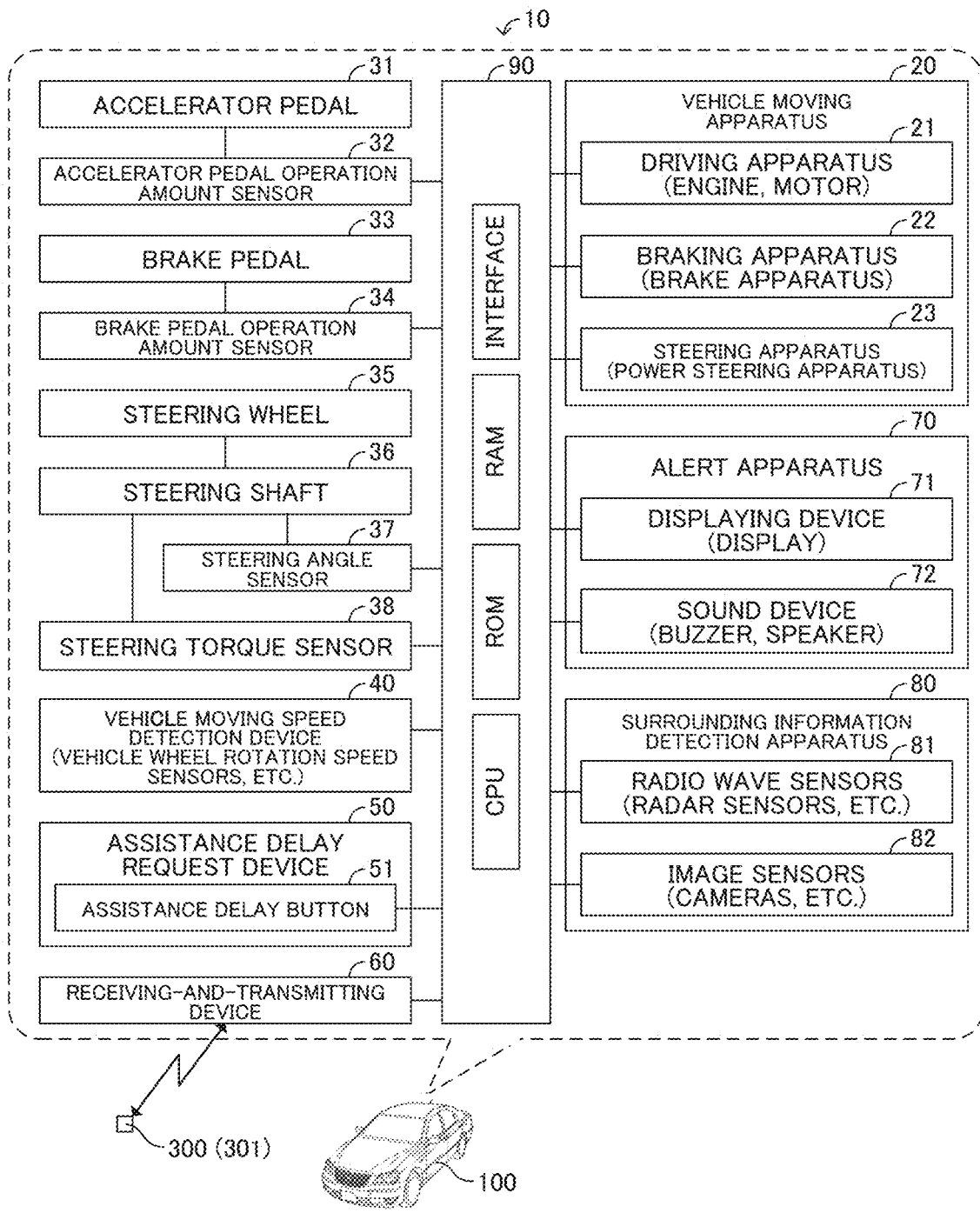
FIG. 1 is a view which shows a vehicle driving assistance apparatus according to an embodiment of the present disclosure and a vehicle or an own vehicle installed with the vehicle driving assistance apparatus.

Below, a vehicle driving assistance apparatus as one of autonomous driving apparatuses or automatic driving apparatuses according to an embodiment of the present disclosure will be described with reference to the drawings. As shown in FIG. 1, the vehicle driving assistance apparatus 10 according to the embodiment of the present disclosure is installed on an own vehicle 100. In the following description, a term "driver" is a driver of the own vehicle 100.
<ECU>

The vehicle driving assistance apparatus 10 includes an ECU 90 as a control device. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM.

<Vehicle Moving Apparatus>

The own vehicle 100 is installed with a vehicle moving apparatus 20. The vehicle moving apparatus 20 includes a driving apparatus 21, a braking apparatus 22, and a steering apparatus 23.
<Driving Apparatus>

The driving apparatus 21 is an apparatus which outputs a driving torque or a driving force to be applied to the own vehicle 100 to move the same. The driving apparatus 21 may include an internal combustion engine and at least one electric motor. The driving apparatus 21 is electrically connected to the ECU 90. The ECU 90 controls the driving torque output from the driving apparatus 21 by controlling operations of the driving apparatus 21.
<Braking Apparatus>

The braking apparatus 22 is an apparatus which outputs a braking torque or a braking force to be applied to the own vehicle 100 to brake the same. The braking apparatus 22 may be a brake apparatus. The braking apparatus 22 is electrically connected to the ECU 90. The ECU 90 controls the braking torque output from the braking apparatus 22 by controlling operations of the braking apparatus 22.
<Steering Apparatus>

The steering apparatus 23 is an apparatus which outputs a steering torque or a steering force to be applied to the own vehicle 100 to steer the same. The steering apparatus 23 may be a power steering apparatus. The steering apparatus 23 is electrically connected to the ECU 90. The ECU 90 controls the steering torque output from the steering apparatus 23 by controlling operations of the steering apparatus 23.
<Sensors, Etc.>

Further, the own vehicle 100 is installed with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle moving speed detection device 40, an assistance delay request device 50, a receiving-and-transmitting device 60, an alert apparatus 70, and a surrounding information detection apparatus 80.
<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32. The ECU 90 calculates and acquires a driver requested driving torque or a driver requested driving force, based on the accelerator pedal operation amount AP and a vehicle moving speed V100 of the own vehicle 100. The driver requested driving torque is the driving torque which the driver requests the driving apparatus 21 to output. The ECU 90 controls the operations of the driving apparatus 21 so as to output the driving torque corresponding to the driver requested driving torque. It should be noted that while the ECU 90 executes an alerting deceleration control or a deceleration-to-stop control described later in detail, the ECU 90 determines a system requested driving torque (i.e., the driving torque to be output from the driving apparatus 21), independently of the accelerator pedal operation amount AP and controls the operations of the driving apparatus 21 so as to output the driving torque corresponding to the system requested driving torque.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal operation amount sensor 34. The ECU 90 calculates and acquires a driver requested braking torque or a driver requested braking force, based on the brake pedal operation amount BP. The driver requested braking torque is the braking torque which the driver requests the braking apparatus 22 to output. The ECU 90 controls the operations of the braking apparatus 22 so as to apply the braking torque corresponding to the driver requested braking torque to the own vehicle 100. It should be noted that while the ECU 90 executes the alerting deceleration control or the deceleration-to-stop control described later in detail, the ECU 90 determines a system requested braking torque (i.e., the braking torque to be applied to the own vehicle 100 by the braking apparatus 22), independently of the brake pedal operation amount BP and controls the operations of the braking apparatus 22 so as to apply the braking torque corresponding to the system requested braking torque to the own vehicle 100.

<Steering Angle Sensor>

The steering angle sensor 37 is a sensor which detects a rotation angle of the steering shaft 36 with respect to its neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle θ, based on the information sent from the steering angle sensor 37.

<Steering Torque Sensor>

The steering torque sensor 38 is a sensor which detects a torque which the driver inputs to the steering shaft 36 via the steering wheel 35. The steering torque sensor 38 is electrically connected to the ECU 90. The steering torque sensor 38 sends information on the detected torque to the ECU 90. The ECU 90 acquires the torque which the driver inputs to the steering shaft 36 via the steering wheel 35 as a driver input torque TQ_D, based on the information sent from the steering torque sensor 38.

<Vehicle Moving Speed Detection Device>

The vehicle moving speed detection device 40 is a device which detects a moving speed of the own vehicle 100. The vehicle moving speed detection device 40 may include vehicle wheel rotation speed sensors. The vehicle moving speed detection device 40 is electrically connected to the ECU 90. The vehicle moving speed detection device 40 sends information on the detected moving speed of the own vehicle 100 to the ECU 90. The ECU 90 acquires the moving speed of the own vehicle 100 as the vehicle moving speed V100, based on the information sent from the vehicle moving speed detection device 40.

The ECU 90 acquires a driver requested steering torque, based on the steering angle θ, the driver input torque TCLD, and the vehicle moving speed V100. The driver requested steering torque is the steering torque which the driver requests the steering apparatus 23 to output. The ECU 90 controls the operations of the steering apparatus 23 so as to output the steering torque corresponding to the driver requested steering torque.

<Assistance Delay Request Device>

The assistance delay request device 50 is a device which is operated by the driver to request the vehicle driving assistance apparatus 10 to perform an assistance delay to change a start timing of starting to execute a driving assistance control described later in detail such that the start timing of starting to execute the driving assistance control is later than an ordinary start timing of starting to execute the driving assistance control and to request the vehicle driving assistance apparatus 10 to terminate performing the assistance delay. In this embodiment, the assistance delay request device 50 is an assistance delay button 51 provided near a driver's seat of the own vehicle 100. The assistance delay button 51 is electrically connected to the ECU 90.

The ECU 90 recognizes that the assistance delay is requested to be performed when the assistance delay button 51 is turned into an ON state (i.e., a state of requesting performing the assistance delay) by the driver. On the other hand, the ECU 90 recognizes that the assistance delay is not requested to be performed when the assistance delay button 51 is turned into an OFF state (i.e., a state of not requesting performing the assistance delay) by the driver.

<Receiving-And-Transmitting Device>

The receiving-and-transmitting device 60 is electrically connected to the ECU 90. The ECU 90 receives wireless signals via the receiving-and-transmitting device 60. The wireless signals are transmitted from a portable device 300 which the driver carries. In addition, the ECU 90 transmits wireless signals via the receiving-and-transmitting device 60. In this embodiment, the portable device 300 is a smart key 301 which has the receiving-and-transmitting device.

The ECU 90 transmits a particular wireless signal via the receiving-and-transmitting device 60 when the ECU 90 detects the driver getting in the own vehicle 100. When the smart key 301 receives the particular wireless signal which the ECU 90 transmits, the smart key 301 transmits another particular wireless signal. The wireless signal transmitted from the smart key 301 includes an identification signal which is used to identify the smart key 301 and a positive assistance request signal which requests performing a positive assistance. As described later in detail, the positive assistance is a driving assistance to change the start timing of starting to execute the driving assistance control of providing the driver with the driving assistance such that the start timing is later than the ordinary start timing.

When the ECU 90 receives the wireless signal which the smart key 301 transmits, the ECU 90 determines whether the smart key 301 which transmits the wireless signal is a registered smart key 301R, based on the identification signal included in the wireless signal. The registered smart key 301R is a smart key registered as a smart key dedicated to the own vehicle 100. In this embodiment, the smart key 301 is the registered smart key 301R. Thus, the ECU 90 determines that the smart key 301 is the registered smart key 301R when the ECU 90 receives the wireless signal which the smart key 301 transmits. That is, the ECU 90 detects the registered smart key 301R.

Further, in this embodiment, the smart key 301 is a device which requests the vehicle driving assistance apparatus 10 to provide the driver with the positive assistance, and the wireless signal transmitted from the smart key 301 includes the positive assistance request signal. Thus, when the ECU 90 receives the wireless signal transmitted from the smart key 301, the ECU 90 determines that the positive assistance is requested to be performed. That is, when the ECU 90 receives from the smart key 301, the positive assistance request signal which represents that a positive assistance function of performing the positive assistance is needed to be performed, the ECU 90 determines that the positive assistance function is requested to be performed.

On the other hand, when the ECU 90 does not detect the registered smart key, or when the ECU 90 detects the registered smart key, but the wireless signal transmitted from the registered smart key does not include the positive assistance request signal, the ECU 90 determines that the positive assistance is not requested to be performed.

It should be noted that a positive assistance request device such as a button or a switch which the driver operates to request the vehicle driving assistance apparatus to perform the positive assistance and cancel a request to perform the positive assistance, may be provided near the driver's seat. The positive assistance is to render the start timing of starting to execute the driving assistance control earlier than the ordinary timing. In this case, the vehicle driving assistance apparatus 10 may be configured to determine whether the positive assistance is requested to be performed, based on a state of the positive assistance request device operated by the driver.

<Alert Apparatus>

Further, the own vehicle 100 is installed with an alert apparatus 70. The alert apparatus 70 is an apparatus which performs various alerts to the driver. In this embodiment, the alert apparatus 70 includes a displaying device 71 and a sound device 72.

<Displaying Device>

The displaying device 71 is a device which displays various images. The displaying device 71 may be a display provided as a part of a combination meter, a head-up display, or a display of a car navigation device. The displaying device 71 is electrically connected to the ECU 90. The ECU 90 displays various images on the displaying device 71.

<Sound Device>

The sound device 72 is a device which outputs various informing sounds, alert sounds, informing announcements, and alert announcements. The sound device 72 may be a buzzer or a speaker. The sound device 72 is electrically connected to the ECU 90. The ECU 90 outputs various informing sounds, alert sounds, informing announcements, or alert announcements from the sound device 72.

<Surrounding Information Detection Apparatus>

The surrounding information detection apparatus 80 is an apparatus which detects information on a situation around the own vehicle 100. In this embodiment, the surrounding information detection apparatus 80 includes radio wave sensors 81 and image sensors 82. The radio wave sensors 81 may be radar sensors such as millimeter-wave radars. The image sensors 82 may be cameras. It should be noted that the surrounding information detection apparatus 80 may include sonic wave sensors such as ultrasonic wave sensors such as clearance sonars and optical sensors such as laser radars such as LiDARs.

<Radio Wave Sensors>

The radio wave sensors 81 are electrically connected to the ECU 90. Each radio wave sensor 81 transmits radio waves and receives reflected waves (i.e., the radio waves reflected by objects). The radio wave sensor 81 sends detection results or information on the transmitted radio waves and the received reflected waves to the ECU 90. In other words, the radio wave sensor 81 detects objects around the own vehicle 100 and sends the detection results or information on the detected objects. The ECU 90 acquires surrounding detection information IS (i.e., information on the objects around the own vehicle 100), based on radio wave information (i.e., the information sent from the radio wave sensors 81). It should be noted that in this embodiment, the objects are vehicles, bikes, bicycles, and persons.

<Image Sensors>

The image sensors 82 are electrically connected to the ECU 90. Each image sensor 82 takes images of a view around the own vehicle 100 and sends information on the taken images to the ECU 90. The ECU 90 acquires the surrounding detection information IS (i.e., the information on the situation around the own vehicle 100), based on image information (i.e., the information sent from the image sensors 82).

Figure 2:
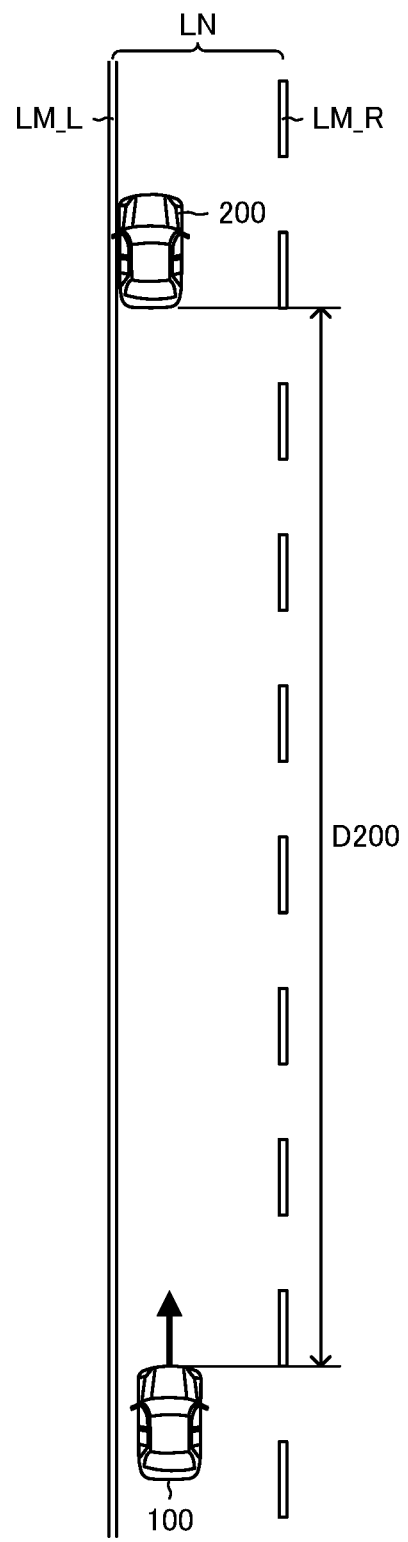
FIG. 2 is a view which shows a distance between the own vehicle and an object or a vehicle in front of the own vehicle.

As shown in FIG. 2, when there is a forward object 200 ahead of the own vehicle 100, the ECU 90 detects the forward object 200, based on the surrounding detection information IS. It should be noted that the forward object 200 is the vehicle, the bike, the bicycle, or the person. In this embodiment, as shown in FIG. 2, the forward object 200 is the vehicle. When the ECU 90 detects the forward object 200, the ECU 90 acquires an object distance D200 and a relative speed ΔV200, based on the surrounding detection information IS. The object distance D200 is a distance between the forward object 200 and the own vehicle 100. The relative speed ΔV200 is a speed of the own vehicle 100 with respect to the forward object 200.

Further, the ECU 90 recognizes a left lane marking LM_L and a right lane marking LM_R which define an own vehicle lane moving lane LN (i.e., a moving lane in which the own vehicle 100 moves), based on the surrounding detection information IS. The ECU 90 specifies an area of the own vehicle moving lane LN, based on the recognized left and right lane markings LM_L and LM_R.

<Summary of Operations of Vehicle Driving Assistance Apparatus>

Next, a summary of operations of the vehicle driving assistance apparatus 10 will be described.

The vehicle driving assistance apparatus 10 is configured to execute the driving assistance control to provide the driver of the own vehicle 100 with the driving assistance when a predetermined execution condition becomes satisfied. The vehicle driving assistance apparatus 10 described below is an apparatus which executes a collision avoidance control to avoid the collision of the own vehicle 100 with the object ahead thereof as the driving assistance control. In this regard, the concept of the present disclosure may be applied to the vehicle driving assistance apparatus which executes the driving assistance control other than the collision avoidance control described below as far as it provides the driver of the own vehicle with the driving assistance when the predetermined execution condition becomes satisfied.

In this embodiment, the collision avoidance control includes an alert control, an alerting deceleration control, and a deceleration-to-stop control. The alert control is one of the driving assistance controls. The alert control is a control to alert the driver to inform the driver of a probability of the collision of the own vehicle 100 with the object ahead thereof. The alerting deceleration control is also one of the driving assistance controls. The alerting deceleration control is a control to decelerate the own vehicle 100 to inform the driver of the probability of the collision of the own vehicle 100 with the object ahead thereof. The deceleration-to-stop control is also one of the driving assistance controls. The deceleration-to-stop control is a control to stop the own vehicle 100 to avoid the collision of the own vehicle 100 with the object ahead thereof.

While the own vehicle 100 moves, the vehicle driving assistance apparatus 10 executes a process to detect the objects such as the vehicles ahead of the own vehicle 100 in a moving direction of the own vehicle 100, based on the surrounding detection information IS. When the vehicle driving assistance apparatus 10 does not detects any objects ahead of the own vehicle 100 in the moving direction of the own vehicle 100, the vehicle driving assistance apparatus 10 executes an ordinary moving control.

The ordinary moving control is a control to (i) output the driving torque corresponding to the driver requested driving torque from the driving apparatus 21 when the driver requested driving torque is greater than zero, (ii) apply the braking torque corresponding to the driver requested braking torque by the braking apparatus 22 when the driver requested braking torque is greater than zero, and (iii) output the steering torque corresponding to the driver requested steering torque from the steering apparatus 23 when the driver requested steering torque is greater than zero.

Figure 3A:
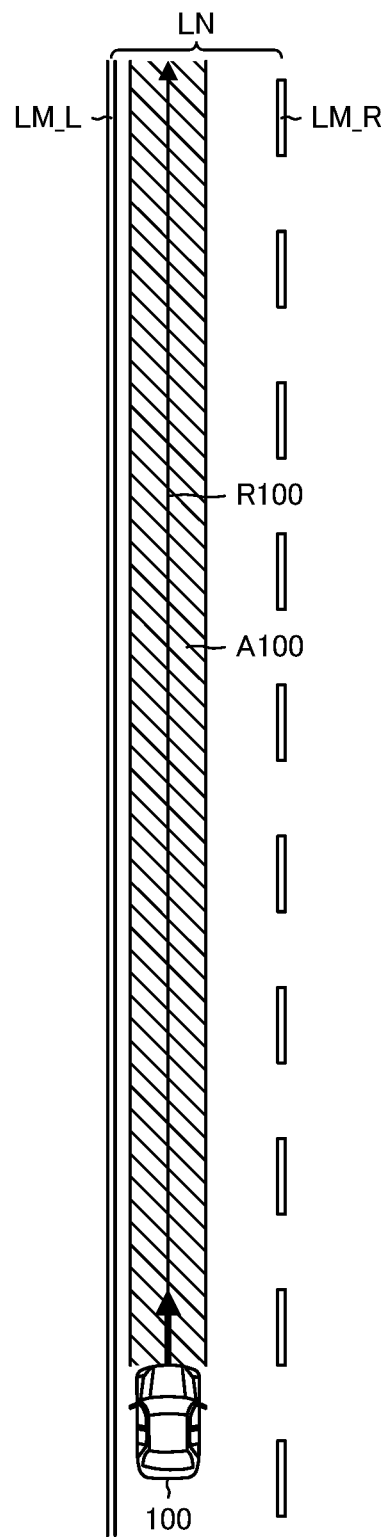
FIG. 3A is a view which shows a predicted moving area of the own vehicle.
Figure 3B:
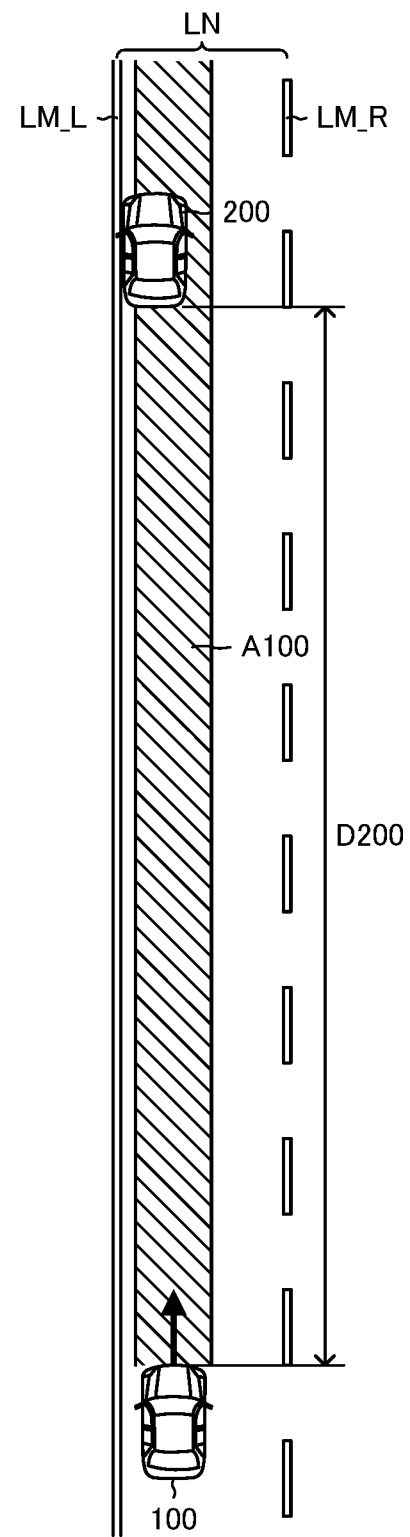
FIG. 3B is a view which shows a scene that there is an object or a vehicle in the predicted moving area of the own vehicle.

When the vehicle driving assistance apparatus 10 detects the forward object 200 (i.e., the object ahead of the own vehicle 100 in the moving direction of the own vehicle 100), the vehicle driving assistance apparatus 10 determines whether the forward object 200 is in a predicted moving area A100, based on the surrounding detection information IS. As shown in FIG. 3A, the predicted moving area A100 is an area which has a center line along a predicted moving route R100 of the own vehicle 100 and a width equal to a width of the own vehicle 100. The predicted moving route R100 is a moving route predicted for the own vehicle 100 to move assuming that the own vehicle 100 moves with the current steering angle θ. Thus, the predicted moving route R100 shown in FIG. 3A has a linear shape. However, the predicted moving route R100 may have a curved shape, depending on situations.

When the detected forward object 200 is not in the predicted moving area A100, the vehicle driving assistance apparatus 10 continues to execute the ordinary moving control.

On the other hand, when the detected forward object 200 is in the predicted moving area A100, the vehicle driving assistance apparatus 10 determines whether an alert condition C1 is satisfied. The alert condition C1 is a predetermined condition for executing the alert control (i.e., the predetermined execution condition). In this embodiment, the alert condition C1 is a condition that a collision index IC is equal to or smaller than a predetermined value or a first determination value IC1.

The collision index IC represents the probability of the collision of the own vehicle 100 with the forward object 200. The collision index IC deceases as the probability of the collision of the own vehicle 100 with the forward object 200 increases. In this embodiment, the vehicle driving assistance apparatus 10 acquires a predicted reaching time TTC as the collision index IC. Then, the vehicle driving assistance apparatus 10 determines that the alert condition C1 becomes satisfied when the predicted reaching time TTC decreases to a predetermined time or a first determination time TTC1. That is, in this embodiment, the alert condition C1 is a condition that the predicted reaching time TTC is equal to or smaller than the first determination time TTC1.

The predicted reaching time TTC is a time predicted to be taken for the own vehicle 100 to reach the forward object 200. The vehicle driving assistance apparatus 10 acquires the predicted reaching time TTC by dividing the object distance D200 by the relative speed ΔV200 (TTC=D200/ ΔV200). Thus, when the relative speed ΔV200 is the same, the predicted reaching time TTC decreases as the own vehicle 100 approaches the forward object 200.

While the forward object 200 is in the predicted moving area A100, the vehicle driving assistance apparatus 10 (i) executes processes to acquire the object distance D200 (i.e., the distance between the forward object 200 and the own vehicle 100), the relative speed ΔV200, and the predicted reaching time TTC with a predetermined calculation cycle, and (ii) executes a process to determine whether the predicted reaching time TTC decreases to the first determination time TTC1 each time the vehicle driving assistance apparatus 10 acquires the predicted reaching time TTC. It should be noted that the vehicle driving assistance apparatus 10 acquires the object distance D200 and the relative speed DV200, based on the surrounding detection information IS.

Figure 4A:
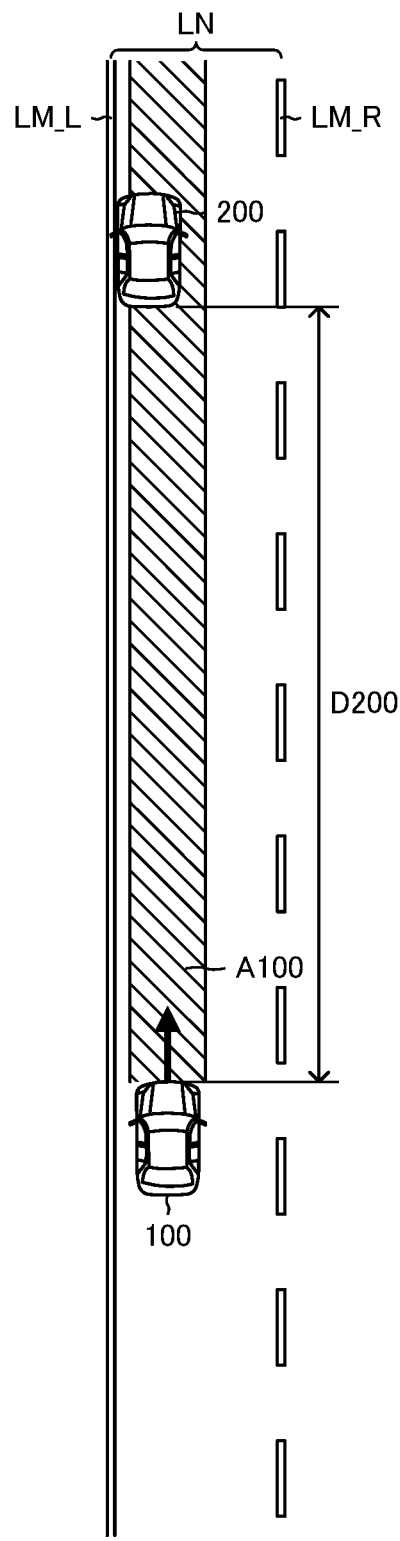
FIG. 4A is a view which shows a scene that the own vehicle approaches the object or the vehicle in the predicted moving area of the own vehicle, and an alert condition becomes satisfied.

While the predicted reaching time TTC is greater than the predicted reaching time TTC, the vehicle driving assistance apparatus 10 continues to execute the ordinary moving control. On the other hand, as shown in FIG. 4A, when the own vehicle 100 comes near the forward object 200, and the predicted reaching time TTC decreases to the first determination time TTC1, the vehicle driving assistance apparatus 10 determines that the alert condition C1 becomes satisfied.

<Alert Control>

When the vehicle driving assistance apparatus 10 determines that the alert condition C1 becomes satisfied, the vehicle driving assistance apparatus 10 starts executing the alert control. The alert control is a control to (i) output the informing sound (or the alert sound) or the informing announcement (or the alert announcement) from the alert apparatus 70 and/or (ii) display an informing image (or an alert image) on the alert apparatus 70.

The informing sound and the alert sound output from the alert apparatus 70 by the alert control are to inform the driver of the forward object 200 (i.e., the object ahead of the own vehicle 100) or the probability of the collision of the own vehicle 100 with the forward object 200. The informing announcement and the alert announcement output from the alert apparatus 70 by the alert control are announcements to announce (i) the forward object 200 (i.e., the object ahead of the own vehicle 100), (ii) the probability of the collision of the own vehicle 100 with the forward object 200, or (iii) a driving operation necessary to avoid the collision of the own vehicle 100 with the forward object 200.

The informing image and the alert image displayed by the alert apparatus 70 by the alert control are images to represent (i) the forward object 200 (i.e., the object ahead of the own vehicle 100) by letters and/or graphics, (ii) the probability of the collision of the own vehicle 100 with the forward object 200 by the letters and/or the graphics, or (iii) the driving operation necessary to avoid the collision of the own vehicle 100 with the forward object 200 by the letters and/or the graphics.

It should be noted that the vehicle driving assistance apparatus 10 continues to execute the ordinary moving control while the vehicle driving assistance apparatus 10 executes the alert control.

<Alerting Deceleration Control>

In addition, after the vehicle driving assistance apparatus 10 starts executing the alert control, the vehicle driving assistance apparatus 10 determines whether an alerting deceleration condition C2 becomes satisfied. The alerting deceleration condition C2 is a predetermined condition or a predetermined execution condition. In this embodiment, the alerting deceleration condition C2 is a condition that the collision index IC is equal to or smaller than a predetermined value or a second determination value IC2 which is smaller than the first determination value IC1. In particular, in this embodiment, the alerting deceleration condition C2 is a condition that the predicted reaching time TTC is equal to or smaller than a predetermined time or a second determination time TTC2 which is smaller than the first determination time TTC1.

After the vehicle driving assistance apparatus 10 starts executing the alert control, the vehicle driving assistance apparatus 10 continues to execute the ordinary moving control as far as the alerting deceleration condition C2 is not satisfied. When the own vehicle 100 comes near the forward object 200, and the collision index IC decreases to the second determination value IC2, the vehicle driving assistance apparatus 10 determines that the alerting deceleration condition C2 becomes satisfied. In particular, in this embodiment, when the predicted reaching time TTC decreases to the second determination time TTC2, the vehicle driving assistance apparatus 10 determines that the alerting deceleration condition C2 becomes satisfied.

When the alerting deceleration condition C2 becomes satisfied, the vehicle driving assistance apparatus 10 starts executing the alerting deceleration control. The alerting deceleration control is a control to decelerate the own vehicle 100 by (i) decreasing the driving force applied to the own vehicle 100, independently of the operation applied to the accelerator pedal 31 by the driver or (ii) controlling the driving force applied to the own vehicle 100 to zero and applying the braking force to the own vehicle 100.

Further, a deceleration of the own vehicle 100 realized by the alerting deceleration control is not the deceleration to stop the own vehicle 100 before the forward object 200. The deceleration of the own vehicle 100 realized by the alerting deceleration control is controlled to the deceleration to cause the driver to know or recognize the forward object 200. Thus, in this embodiment, decelerating the own vehicle 100 realized by the alerting deceleration control is one of the alert controls for the driver.

It should be noted that while the vehicle driving assistance apparatus 10 executes the alerting deceleration control, the vehicle driving assistance apparatus 10 continues to execute the alert control, but the vehicle driving assistance apparatus 10 may be configured to stop executing the alert control when the vehicle driving assistance apparatus 10 starts executing the alerting deceleration control.

<Deceleration-to-Stop Control>

Further, after the vehicle driving assistance apparatus 10 starts executing the alerting deceleration control, the vehicle driving assistance apparatus 10 determines whether a deceleration-to-stop condition C3 becomes satisfied. The deceleration-to-stop condition C3 is a predetermined condition or a predetermined execution condition. In this embodiment, the deceleration-to-stop condition C3 is a condition that the collision index IC is equal to or smaller than a predetermined value or a third determination value IC3 which is smaller than the second determination value IC2. In particular, in this embodiment, the deceleration-to-stop condition C3 is a condition that the predicted reaching time TTC is equal to or smaller than a predetermined time or a third determination time TTC3 which is smaller than the second determination time TTC2.

Figure 4B:
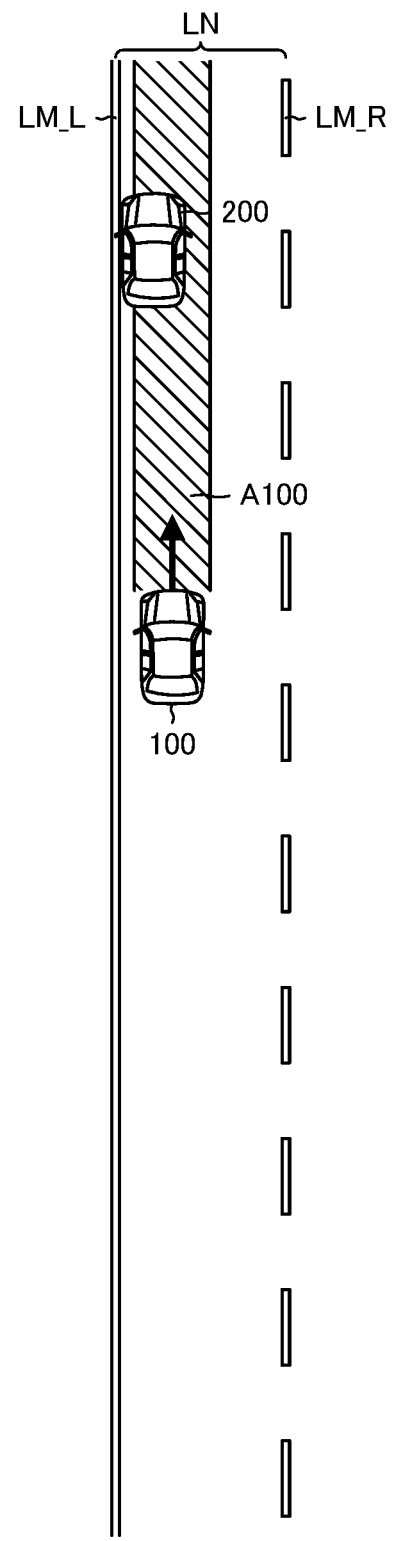
FIG. 4B is a view which shows a scene that the own vehicle moves close to the object or the vehicle in the predicted moving area of the own vehicle, and a deceleration-to-stop condition becomes satisfied.

As shown in FIG. 4B, when the own vehicle 100 comes close to the forward object 200, and the collision index IC decreases to the third determination value IC3, the vehicle driving assistance apparatus 10 determines that the deceleration-to-stop condition C3 becomes satisfied. In particular, in this embodiment, when the predicted reaching time TTC decreases to the third determination time TTC3, the vehicle driving assistance apparatus 10 determines that the deceleration-to-stop condition C3 becomes satisfied.

When the deceleration-to-stop condition C3 becomes satisfied, the vehicle driving assistance apparatus 10 starts executing the deceleration-to-stop control. The deceleration-to-stop control is a control to stop the own vehicle 100 before the forward object 200 by (i) controlling the driving force applied to the own vehicle 100 to zero and (ii) forcibly applying the braking force to the own vehicle 100, independently of the operations applied to the accelerator pedal 31 or the brake pedal 33 by the driver.

Figures 5A, 5B:
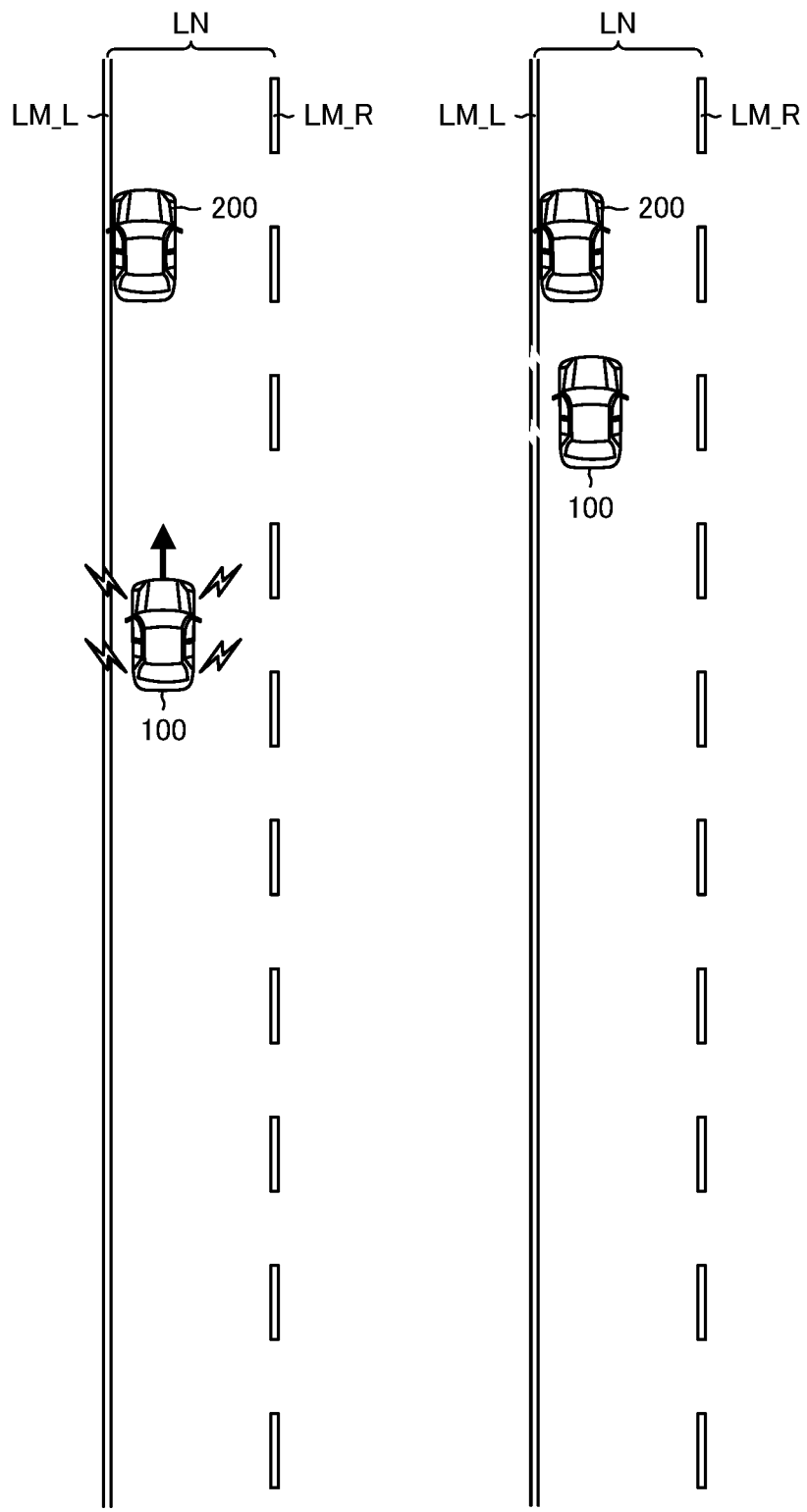
FIG. 5A is a view which shows a scene that a deceleration-to-stop control starts to be executed.
FIG. 5B is a view which shows a scene that the own vehicle is stopped by the deceleration-to-stop control.

When the vehicle driving assistance apparatus 10 starts executing the deceleration-to-stop control, the vehicle driving assistance apparatus 10 (i) sets the deceleration of the own vehicle 100 necessary to stop the own vehicle 100 before the forward object 200 as a target deceleration and (ii) controls the braking force applied to the own vehicle 100 so as to decelerate the own vehicle 100 at the target deceleration. Thereby, as shown in FIG. 5A, the driving force applied to the own vehicle 100 is controlled to zero, and the braking force is applied to the own vehicle 100. Then, as shown in FIG. 5B, the own vehicle 100 is stopped before the forward object 200. Thereby, the collision of the own vehicle 100 with the forward object 200 is avoided.

When the vehicle driving assistance apparatus 10 stops the own vehicle 100 by the deceleration-to-stop control, the vehicle driving assistance apparatus 10 starts executing a stopped-state holding control to hold the own vehicle 100 stopped by continuing applying the braking force to the own vehicle 100.

<Assistance Delay And Positive Assistance>

If the driving assistance control such as the alert control starts to be executed when the driver operates the brake pedal 33 to avoid the collision of the own vehicle 100 with the forward object 200, the driver may feel inconvenience. Thus, the driver may desire the assistance delay to render the start timing of starting to execute the driving assistance control later than the ordinary timing when the driver starts a collision avoidance driving operation (i.e., a driving operation to avoid the collision of the own vehicle 100 with the forward object 200). In this embodiment, the vehicle driving assistance apparatus 10 has an assistance delay function to perform the assistance delay. The driver desiring the assistance delay can request the vehicle driving assistance apparatus 10 to perform the assistance delay in response to the driver starting the collision avoidance driving operation by operating the assistance delay button 51 to the ON state. In other words, when the assistance delay button 51 is operated by the driver and is turned into the ON state, the vehicle driving assistance apparatus 10 is requested to perform the assistance delay in response to the vehicle driving assistance apparatus 10 determining that the driver starts the collision avoidance driving operation.

The driver may desire the positive assistance to render the start timing of starting to execute the driving assistance control earlier than the ordinary timing in order to enhance a moving safety of the own vehicle 100. In this embodiment, the vehicle driving assistance apparatus 10 has a positive assistance function to perform the positive assistance. The driver desiring the positive assistance can request the vehicle driving assistance apparatus 10 to perform the positive assistance by getting in the own vehicle 100 with the registered smart key 301R. In other words, when the driver gets in the own vehicle 100 with the registered smart key 301R, the vehicle driving assistance apparatus 10 is requested to perform the positive assistance.

In this regard, the driver getting in the own vehicle 100 with the registered smart key 301R desires the positive assistance. Under the situation, if the assistance delay button 51 is at the ON state, the vehicle driving assistance apparatus 10 is requested to perform the assistance delay and the positive assistance. In this case, even when the start timing of starting to execute the driving assistance control is set to a timing earlier than the ordinary timing by the positive assistance, the start timing of starting to execute the driving assistance control is changed to a later timing by the assistance delay if the driver is determined to start the collision avoidance driving operation before the driving assistance control starts to be executed. Thereby, the driving assistance as desired by the driver cannot be provided.

Accordingly, the vehicle driving assistance apparatus 10 is configured to perform the assistance delay and the positive assistance as described below.

When (i) the assistance delay button 51 is at the ON state and thus, the assistance delay is requested to be performed, and (ii) the positive assistance is not requested to be performed, the vehicle driving assistance apparatus 10 performs the assistance delay in response to determining that the driver starts the collision avoidance driving operation. In other words, when (i) the assistance delay button 51 is at the ON state and thus, the assistance delay is requested to be performed, and (ii) the positive assistance is not requested to be performed, the vehicle driving assistance apparatus 10 performs the assistance delay in response to detecting a predetermined driving operation applied to the own vehicle 100 by the driver which renders the driving assistance by the collision avoidance driving operation unnecessary.

That is, the vehicle driving assistance apparatus 10 performs an assistance delay setting to decrease the first determination value IC1, the second determination value IC2, and the third determination value IC3. In particular, in this embodiment, the vehicle driving assistance apparatus 10 executes the assistance delay setting to decrease the first determination time TTC1, the second determination time TTC2, and the third determination time TTC3.

In particular, when (i) the assistance delay is requested to be performed but the positive assistance is not requested to be performed, and (ii) the vehicle driving assistance apparatus 10 does not determine that the driver starts the collision avoidance driving operation, the vehicle driving assistance apparatus 10 sets (i) the first determination value IC1 to a base value (i.e., a first base determination value IC1_B), (ii) the second determination value IC2 to a base value (i.e., a second base determination value IC2_B) smaller than the first base determination value IC1_B, and (iii) the third determination value IC3 to a base value (i.e., a third base determination value IC3_B) smaller than the second base determination value IC2_B.

In particular, in this embodiment, when (i) the assistance delay is requested to be performed but the positive assistance is not requested to be performed, and (ii) the vehicle driving assistance apparatus 10 does not determine that the driver starts the collision avoidance driving operation, the vehicle driving assistance apparatus 10 sets (i) the first determination time TTC1 to a base time (i.e., a first base determination time TTC1_B), (ii) the second determination time TTC2 to a base time (i.e., a second base determination time TTC2_B) smaller than the first base determination time TTC1_B, and (iii) the third determination time TTC3 to a base time (i.e., a third base determination time TTC3_B) smaller than the second base determination time TTC2_B.

In this case, the driving assistance control such as the alert control starts to be executed at the ordinary timing (i.e., the base timing).

On the other hand, when (i) the assistance delay is requested to be performed but the positive assistance is not requested to be performed, and (ii) the vehicle driving assistance apparatus 10 determines that the driver starts the collision avoidance driving operation, the vehicle driving assistance apparatus 10 sets (i) the first determination value IC1 to a predetermined value (i.e., a first assistance delay determination value IC1_D) smaller than the first base determination value IC1_B, (ii) the second determination value IC2 to a predetermined value (i.e., a second assistance delay determination value IC2_D) smaller than the second base determination value IC2_B and the first assistance delay determination value IC1_D, and (iii) the third determination value IC3 to a predetermined value (i.e., a third assistance delay determination value IC3_D) smaller than the third base determination value IC3_B and the second assistance delay determination value IC2_D.

In particular, in this embodiment, when (i) the assistance delay is requested to be performed but the positive assistance is not requested to be performed, and (ii) the vehicle driving assistance apparatus 10 determines that the driver starts the collision avoidance driving operation, the vehicle driving assistance apparatus 10 sets (i) the first determination time TTC1 to a predetermined time (i.e., a first assistance delay determination time TTC1_D) smaller than the first base determination time TTC1_B, (ii) the second determination time TTC2 to a predetermined time (i.e., a second assistance delay determination time TTC2_D) smaller than the second base determination time TTC2_B and the first assistance delay determination time TTC1_D, and (iii) the third determination time TTC3 to a predetermined time (i.e., a third assistance delay determination time TTC3_D) smaller than the third base determination time TTC3_B and the second assistance delay determination time TTC2_D.

Thereby, the driving assistance control such as the alert control starts to be executed at a timing later than the ordinary timing (i.e., the base timing).

Further, when (i) the assistance delay button 51 is at the ON state and thus, the assistance delay is requested to be performed, and (ii) the positive assistance is requested to be performed, the vehicle driving assistance apparatus 10 performs the positive assistance. In this case, the vehicle driving assistance apparatus 10 does not execute the assistance delay but continues performing the positive assistance in response to the driver being determined to start the collision avoidance driving operation.

That is, the vehicle driving assistance apparatus 10 performs a positive assistance setting to increase the first determination value IC1, the second determination value IC2, and the third determination value IC3 when the positive assistance and the assistance delay are both requested to be performed. In this case, the vehicle driving assistance apparatus 10 does not perform the assistance delay setting and maintains the increased first determination value IC1, the increased second determination value IC2, and the increased third determination value IC3 even when the driver is determined to start the collision avoidance driving operation. In particular, in this embodiment, the vehicle driving assistance apparatus 10 performs the positive assistance setting to increase the first determination time TTC1, the second determination time TTC2, and the third determination time TTC3 even when the assistance delay is requested to be performed when the positive assistance is requested to be performed. In this case, the vehicle driving assistance apparatus 10 does not perform the assistance delay setting and maintains the increased first determination time TTC1, the increased second determination time TTC2, and the increased third determination time TTC3 even when the driver is determined to start the collision avoidance driving operation.

In particular, when the assistance delay and the positive assistance are both requested to be performed, the vehicle driving assistance apparatus 10 sets (i) the first determination value IC1 to a predetermined value (i.e., a first positive assistance determination value IC1_A) greater than the first base determination value IC1_B, (ii) the second determination value IC2 to a predetermined value (i.e., a second positive assistance determination value IC2_A) greater than the second base determination value IC2_B and smaller than the first positive assistance determination value IC1_A, and (iii) the third determination value IC3 to a predetermined value (i.e., a third positive assistance determination value IC3_A) greater than the third base determination value IC3_B. and smaller than the second positive assistance determination value IC2_A. Then, even when the vehicle driving assistance apparatus 10 determines that the driver starts the collision avoidance driving operation, the vehicle driving assistance apparatus 10 maintains setting the first determination value IC1, the second determination value IC2, and the third determination value IC3 to the first positive assistance determination value IC1_A, the second positive assistance determination value IC2_A, and the third positive assistance determination value IC3_A, respectively.

In particular, in this embodiment, when the assistance delay and the positive assistance are both requested to be performed, the vehicle driving assistance apparatus 10 sets (i) the first determination time TTC1 to a predetermined time (i.e., a first positive assistance determination time TTC1_A) greater than the first base determination time TTC1_B, (ii) the second determination time TTC2 to a predetermined time (i.e., a second positive assistance determination time TTC2_A) greater than the second base determination time TTC2_B. and smaller than the first positive assistance determination time TTC1_A, and (iii) the third determination time TTC3 to a predetermined time (i.e., a third positive assistance determination time TTC3_A) greater than the third base determination time TTC3_B. and smaller than the second positive assistance determination time TTC2_A. Then, even when the vehicle driving assistance apparatus 10 determines that the driver starts the collision avoidance driving operation, the vehicle driving assistance apparatus 10 maintains setting the first determination time TTC1, the second determination time TTC2, and the third determination time TTC3 to the first positive assistance determination time TTC1_A, the second positive assistance determination time TTC2_A, and the third positive assistance determination time TTC3_A, respectively.

Thereby, when the driver desires that the driving assistance such as the alert starts to be performed at an earlier timing, the driving assistance control such as the alert control starts to be executed at the earlier timing.

It should be noted that the vehicle driving assistance apparatus 10 performs the positive assistance or the positive assistance setting when the positive assistance is requested to be performed, and the assistance delay is not requested to be performed.

It should be noted that the vehicle driving assistance apparatus 10 may be configured to determine that the collision avoidance driving operation starts when the brake pedal operation amount BP becomes equal to or greater than a predetermined value, or when the steering angle θ becomes equal to or greater than a predetermined value, or when a shift lever is operated to increase a transmission gear ratio, or when the own vehicle 100 is determined to change lanes due to a blinker lever being operated.

Further, in an example described above, the vehicle driving assistance apparatus 10 performs the assistance delay setting when (i) the assistance delay is requested to be performed but the positive assistance is not requested to be performed, and (ii) the vehicle driving assistance apparatus 10 determines that the collision avoidance driving operation starts. In this regard, the vehicle driving assistance apparatus 10 may be configured to perform the assistance delay setting, independently of whether the vehicle driving assistance apparatus 10 determines that the collision avoidance driving operation starts.

The summary of the operations of the vehicle driving assistance apparatus 10 has been described.

As described above, the concept of the present disclosure can be applied to the vehicle driving assistance apparatus 10 which executes the driving assistance control other than the collision avoidance control described above. In this regard, the driving assistance control other than the collision avoidance control may be (i) a collision avoidance control or a steering collision avoidance control to execute an alert control and an autonomous steering control to avoid the collision of the own vehicle with the object ahead of the own vehicle or (ii) a lane departure prevention control to execute an alert control or an autonomous steering control to prevent the own vehicle from departing from the moving lane.

The alert control of the steering collision avoidance control is one of the driving assistance controls. The alert control of the steering collision avoidance control is a control to alert the driver to inform the driver of the probability of the collision of the own vehicle with the object ahead thereof. The autonomous steering control of the steering collision avoidance control is also one of the driving assistance controls. The autonomous steering control of the steering collision avoidance control is a control to steer the own vehicle to avoid the collision of the own vehicle with the object ahead thereof.

The alert control of the lane departure prevention control is also one of the driving assistance controls. The alert control of the lane departure prevention control is a control to alert the driver to inform the driver of a probability of the own vehicle departing from the moving lane. The autonomous steering control of the lane departure prevention control is also one of the driving assistance controls. The autonomous steering control of the lane departure prevention control is a control to steer the own vehicle to return to a center of the moving lane.

<Specific Operations of Vehicle Driving Assistance Apparatus>

Figure 6:
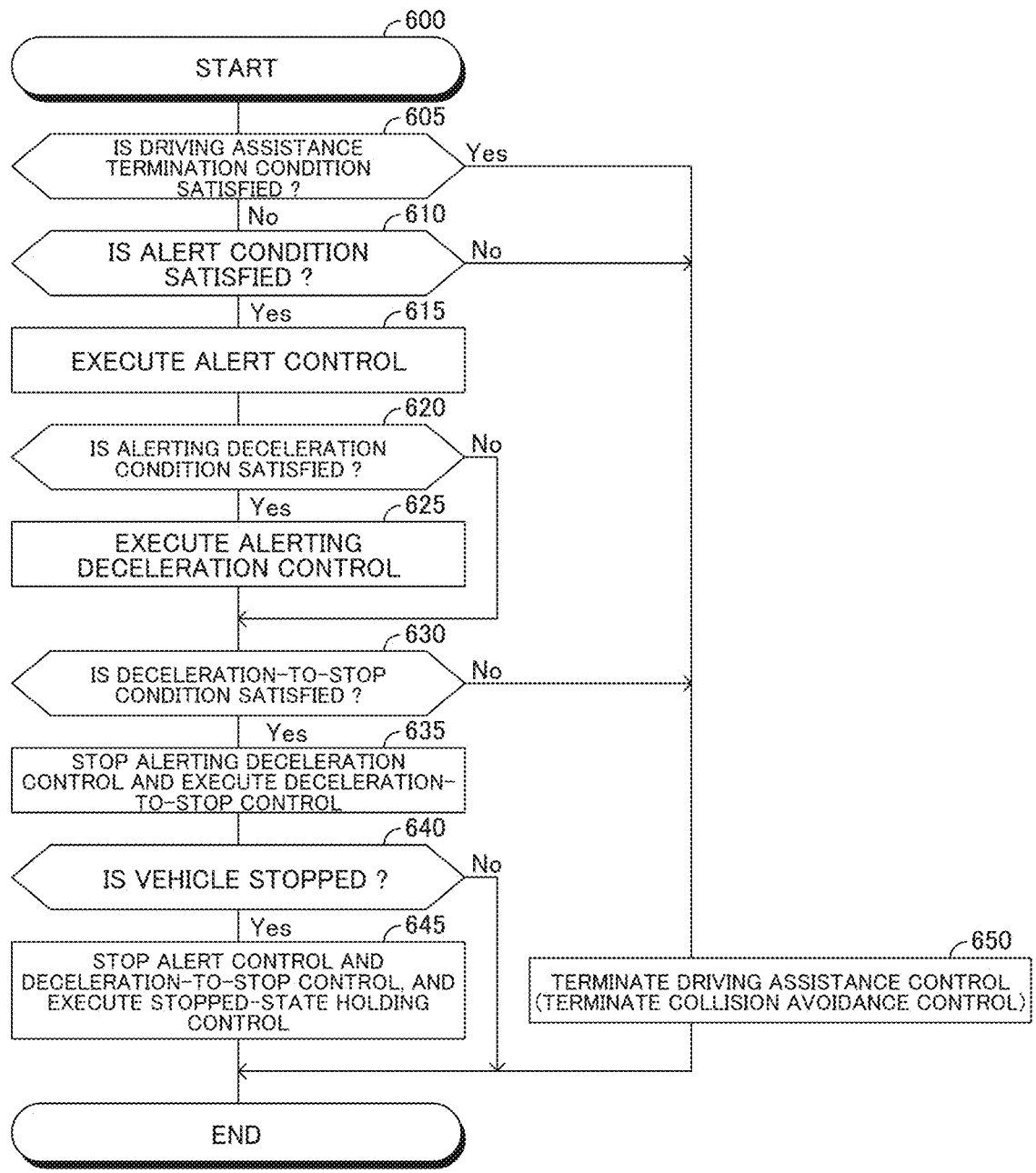
FIG. 6 is a view which shows a flowchart of a routine executed by the vehicle driving assistance apparatus according to the embodiment of the present disclosure.

Next, specific operations of the vehicle driving assistance apparatus 10 will be described. The CPU of the ECU 90 of the vehicle driving assistance apparatus 10 according to the embodiment of the present disclosure is configured or programmed to execute a routine shown in FIG. 6 with a predetermined calculation cycle. Thus, at a predetermined timing, the CPU starts a process from a step 600 of the routine shown in FIG. 6 and proceeds with the process to a step 605 to determine whether a driving assistance termination condition C4 is satisfied.

The driving assistance termination condition C4 is a condition for terminating executing the driving assistance control. For example, when the driving assistance control is the collision avoidance control described above, the driving assistance termination condition C4 is a condition that the own vehicle 100 is stopped by the driver operating the brake pedal 33 and a condition that the driver operates the steering wheel 35, and the forward object 200 is not in the predicted moving area A100.

When the CPU determines "Yes" at the step 605, the CPU proceeds with the process to a step 650 to terminate executing the driving assistance control and then, terminate executing this routine once. In this case, when the CPU executes the alert control, the CPU terminates executing the alert control. When the CPU executes the alerting deceleration control, the CPU terminates executing the alerting deceleration control. When the CPU executes the deceleration-to-stop control, the CPU terminates executing the deceleration-to-stop control.

On the other hand, when the CPU determines "No" at the step 605, the CPU proceeds with the process to a step 610 to determine whether the alert condition C1 is satisfied. When the CPU determines "Yes" at the step 610, the CPU proceeds with the process to a step 615 to execute the alert control. Next, the CPU proceeds with the process to a step 620 to determine whether the alerting deceleration condition C2 is satisfied. When the CPU determines "Yes" at the step 620, the CPU proceeds with the process to a step 625 to execute the alerting deceleration control. Then, the CPU proceeds with the process to a step 630. On the other hand, when the CPU determines "No" at the step 620, the CPU proceeds with the process directly to the step 630.

When the CPU proceeds with the process to the step 630, the CPU determines whether the deceleration-to-stop condition C3 is satisfied. When the CPU determines "Yes" at the step 630, the CPU proceeds with the process to a step 635 to stop executing the alerting deceleration control and execute the deceleration-to-stop control. Next, the CPU proceeds with the process to a step 640 to determine whether the own vehicle 100 is stopped.

When the CPU determines "Yes" at the stpe 640, the CPU proceeds with the process to a step 645 to stop executing the alert control and the deceleration-to-stop control and execute the stopped-state holding control. Then, the CPU terminates executing this routine once. On the other hand, when the CPU determines "No" at the step 640, the CPU terminates executing this routine once.

When the CPU determines "No" at the step 610 or 630, the CPU proceeds with the process to the step 650 to terminate executing the collision avoidance control. Then, the CPU terminates executing this routine once.

Figure 7:
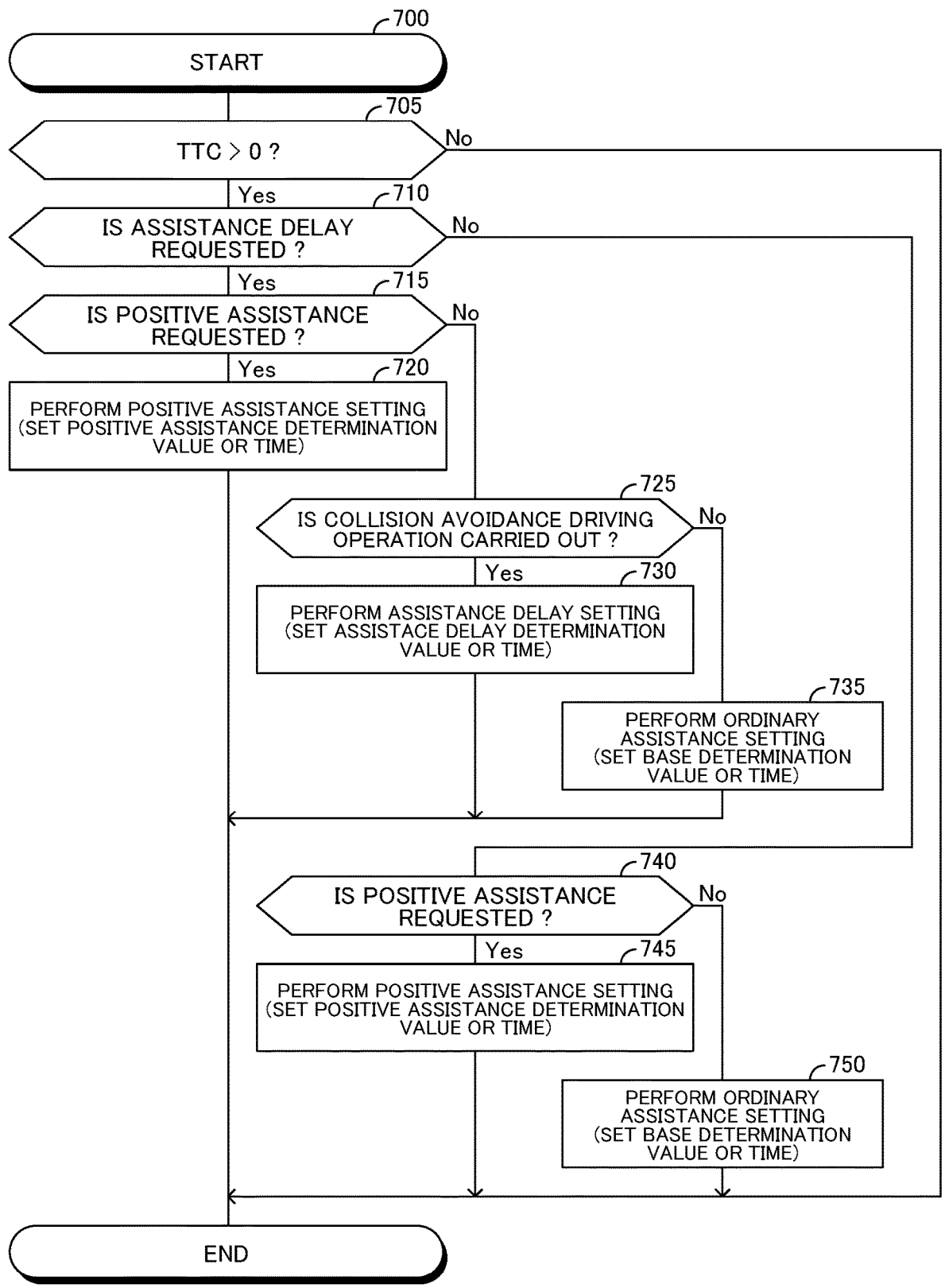
FIG. 7 is a view which shows a flowchart of a routine executed by the vehicle driving assistance apparatus according to the embodiment of the present disclosure.

In addition, the CPU is configured or programmed to execute a routine shown in FIG. 7 with the predetermined calculation cycle. Thus, at a predetermined timing, the CPU starts a process from a step 700 of the routine shown in FIG. 7 and proceeds with the process to a step 705 to determine whether the predicted reaching time TTC is greater than zero. That is, the CPU determines whether the forward object 200 is detected, and the predicted reaching time TTC has been calculated.

When the CPU determines "Yes" at the step 705, the CPU proceeds with the process to a step 710 to determine whether the assistance delay is requested to be performed. When the CPU determines "Yes" at the step 710, the CPU proceeds with the process to a step 715 to determine whether the positive assistance is requested to be performed. When the CPU determines "Yes" at the step 715, the CPU proceeds with the process to a step 720 to perform the positive assistance setting. In this case, in this embodiment, the first determination time TTC1 to the third determination time TTC3 are set to the first positive assistance determination time TTC1_A to the third positive assistance determination time TTC3_A, respectively. Thereby, the start timing of starting to execute the driving assistance control is rendered earlier than the ordinary timing or the base timing. Then, the CPU terminates executing this routine once.

On the other hand, when the CPU determines "No" at the step 715, the CPU proceeds with the process to a step 725 to determine whether the collision avoidance driving operation predictively starts. When the CPU determines "Yes" at the step 725, the CPU proceeds with the process to a step 730 to perform the assistance delay setting. In this case, in this embodiment, the first determination time TTC1 to the third determination time TTC3 are set to the first assistance delay determination time TTC1_D to the third assistance delay determination time TTC3_D, respectively. Thereby, the start timing of starting to execute the driving assistance control becomes later than the ordinary timing or the base timing. Then, the CPU terminates executing this routine once.

On the other hand, when the CPU determines "No" at the step 725, the CPU proceeds with the process to a step 735 to perform the ordinary assistance setting. In this case, in this embodiment, the first determination time TTC1 to the third determination time TTC3 are set to the first base determination time TTC1_B to the third base determination time TTC3_B, respectively. Thereby, the start timing of starting to execute the driving assistance control is set to the ordinary timing or the base timing. Then, the CPU terminates executing this routine once.

When the CPU determines "No" at the step 710, the CPU proceeds with the process to a step 740 to determine whether the positive assistance is requested to be performed. When the CPU determines "Yes" at the step 740, the CPU proceeds with the process to a step 745 to perform the positive assistance setting. In this case, in this embodiment, the first determination time TTC1 to the third determination time TTC3 are set to the first positive assistance determination time TTC1_A to the third positive assistance determination time TTC3_A, respectively. Thereby, the start timing of starting to execute the driving assistance control is rendered earlier than the ordinary timing or the base timing. Then, the CPU terminates executing this routine once.

On the other hand, when the CPU determines "No" at the step 740, the CPU proceeds with the process to a step 750 to perform the ordinary assistance setting. In this case, in this embodiment, the first determination time TTC1 to the third determination time TTC3 are set to the first base determination time TTC1_B to the third base determination time TTC3_B, respectively. Thereby, the start timing of the driving assistance control is set to the ordinary timing or the base timing. Then, the CPU terminates executing this routine once.

When the CPU determines "No" at the step 705, the CPU terminates executing this routine once.

The specific operations of the vehicle driving assistance apparatus 10 have been described.

It should be noted that the present disclosure is not limited to the aforementioned embodiments, and various modifications can be employed within the scope of the present disclosure.

What is claimed is:

1. A vehicle driving assistance apparatus comprising:
an electronic control unit configured to:
execute a driving assistance control which provides a driver of an own vehicle with a driving assistance when a predetermined execution condition becomes satisfied, perform an assistance delay function and a positive assistance function, and determine an ordinary timing, the ordinary timing being a time of detection of a collision before the predetermined execution condition becomes satisfied, the assistance delay function being a function to change the predetermined execution condition such that a timing of starting to execute the driving assistance control is later than the ordinary timing, and the positive assistance function being a function to change the predetermined execution condition such that the timing of starting to execute the driving assistance control is earlier than the ordinary timing, wherein the electronic control unit is configured not to perform the assistance delay function even when the assistance delay function is requested to be performed while the positive assistance function is requested to be performed.

2. The vehicle driving assistance apparatus as set forth in claim 1, wherein the assistance delay function is a function to change the predetermined execution condition such that the timing of starting to execute the driving assistance control is later than the ordinary timing when a predetermined driving operation is detected, and wherein the predetermined driving operation is a driving operation to the own vehicle which is carried out by the driver and leads to a probability of rendering the driving assistance by the driving assistance control unnecessary.

3. The vehicle driving assistance apparatus as set forth in claim 2, wherein the driving assistance control is a deceleration-to-stop control which autonomously decelerates the own vehicle to stop to avoid a collision of the own vehicle with an object ahead of the own vehicle, and wherein the predetermined driving operation is a driving operation to the own vehicle carried out by the driver to avoid the collision of the own vehicle with the object.

4. The vehicle driving assistance apparatus as set forth in claim 1, wherein the electronic control unit is configured to determine that the positive assistance function is requested to be performed when the electronic control unit receives a predetermined signal from the driver, and wherein the predetermined signal is a signal which represents that the driver needs performing the positive assistance function.

* * * * *